United States Patent [19]
Soni et al.

[11] Patent Number: 5,999,739
[45] Date of Patent: Dec. 7, 1999

[54] METHOD AND APPARATUS FOR ELIMINATION OF REDUNDANT BRANCH INSTRUCTIONS FROM A PROGRAM

[75] Inventors: Vineet Soni, Brighton, Mass.; Andrew Ayers, Amherst, N.H.

[73] Assignee: Hewlett-Packard Company, Palo Alto, Calif.

[21] Appl. No.: 08/972,558

[22] Filed: Nov. 18, 1997

Related U.S. Application Data

[60] Provisional application No. 60/047,865, May 29, 1997.

[51] Int. Cl.$^6$ ....................................................... G06F 9/45
[52] U.S. Cl. .......................... 395/709; 395/708; 712/234
[58] Field of Search .................................... 395/708, 709; 712/234

[56] References Cited

U.S. PATENT DOCUMENTS

| | | | |
|---|---|---|---|
| 5,202,995 | 4/1993 | O'Brien | 395/709 |
| 5,511,198 | 4/1996 | Hotta | 395/709 |
| 5,923,883 | 7/1999 | Tanaka et al. | 395/709 |

OTHER PUBLICATIONS

"Global Value Numbers and Redundant Computations", Rosen et al., Proc. 15th ACM SIGACT–SIGPLAN Symposium on Programming Languages (Jan., 1988) pp. 12–27.

"Compact Representations of Control Dependence", Cytron et al. Proc. ACM SIGPLAN '90 Symposium on Programming Language Design . . . (Jun., 1990) pp. 337–351.

"Constant Propagation with Conditional Branches", Wegman et al., ACM Trans. on Programming Languages . . . , V 13, No. 2, Apr. 1991, pp. 181–210.

Choi, S.–U.; Par, S.–S.; Park, M.–S.; "Eliminating Conditional Branches for Enhancing Instruction Level Parallelism in VLIW Compiler"; Proceedings, Second International Symposium on Parallel Architectures, Algorithms, and Networks; pp. 193–199, Jun. 1996.

Mueller, F.; Whalley, D.; "Avoiding Conditional Branches by Code Replication"; ACM SIGPLAN Notices; vol. 30, No. 6, pp. 56–66, Jun. 1995.

Bacon, D.; Graham, S.; Sharp, O.; "Compiler Transformations for High–Performance Computing"; ACM Computing Surveys; vol. 26, No. 4, pp. 345–420, Dec. 1994.

Briggs, P.; Cooper, K.; "Effective Partial Redundancy Elimination"; Proceedings of the ACM SIGPLAN '94 Conference on Programming Language Design and Implementaion; pp. 159–170, 1994.

"Branch Replacement Optimizations for Trace Directed Program Restructuring"; IBM Technical Disclosure Bulletin; vol. 36, No. 9B, pp. 557–558, Sep. 1993.

*Primary Examiner*—Tariq R. Hafiz
*Assistant Examiner*—Brian Sattizahn

[57] ABSTRACT

The procedure of the invention eliminates redundant conditional branch statements (CBSs) from a program, wherein the program includes (i) plural blocks of program statements, (ii) a definition statement (DEF) for each variable in the program that assigns a value to each variable, (iii) a defining point (DEFP) which is a first point in the program that a value is calculated, and (iv) plural CBSs. Each CBS transfers control to one of two target blocks of program statements, dependent upon an operation code and controlling variable that form a part of the test associated with the CBS. The procedure associates all DEFs which define a same value, with a DEFP for the same value and determines (i) a controlling variable upon which a test CBS is dependent, (ii) a DEF of the controlling variable of the test CBS and (iii) a DEFP for the DEF of the controlling variable. If a value first calculated at the DEFP found in (iii) is utilized by a CBS, the procedure finds which arm of the CBS reaches the test CBS; and then revises a block of program statements that include the test CBS, to eliminate at least a test required by the test CBS, and replace the conditional branch with an unconditional branch.

8 Claims, 4 Drawing Sheets

METHOD AND APPARATUS FOR ELIMINATION OF REDUNDANT BRANCH INSTRUCTIONS FROM A PROGRAM

This patent application claims priority from Provisional Patent Application Ser. No. 60/047,865, filed May 29, 1997.

FIELD OF THE INVENTION

This invention relates to a method and apparatus for improving the performance of a program and, more particularly, to a method and apparatus for the elimination of redundant branch instructions from such a program.

BACKGROUND OF THE INVENTION

A program's instructions are generally of two types: branch instructions and non-branch instructions. Branch instructions determine a next instruction to be executed, based on a value of some program variable. Such branch instructions are typically "expensive" to execute in terms of processing time. It is known that the run-time performance of a program can be improved if the number of branch instructions is reduced. Further, if it can be established that a later-occurring branch instruction is redundant to an earlier-occurring branch instruction, then the Boolean variable resulting from the test associated with the previous branch instruction (i.e., true, false) can be used to replace the later occurring branch instruction and to effect a joinder with subsequent program statements.

Most redundancy elimination algorithms are of two kinds. A lexical algorithm deals with the entire program but can only detect redundancies among computations of lexically identical expressions. An expression is lexically identical to a previous expression if both expressions apply exactly the same operator to exactly the same operands. A value-numbering algorithm, on the other hand, can recognize redundancies among expressions that are lexically different, but that are certain to compute the same value. Value numbering is accomplished by assigning special symbolic names, called value numbers, to expressions. If value numbers assigned to operands of two expressions are identical and if the operators applied by the expressions are identical, then the expressions are certain to have the same values.

In the past, value numbering algorithms have usually been restricted to basic blocks (sequences of computations with no branching) or extended basic blocks (sequences of computations with no joins).

Rosen et al. in "Global Value Numbers and Redundant Computations", Proceedings of the 15th Annual ACM SIGACT-SIGPLAN Symposium on Principles of Programming Languages", San Diego, Calif. January 1988, pgs. 12–27, describe a global value numbering algorithm that is employed to associate a symbolic value with every variable definition in a program. The Rosen et al. algorithm guarantees that if two variable definitions have the same symbolic value at compile time, then they have the same actual value at run time. The converse, however, is not true. Thus, if the actual values are the same at run time, it is not necessarily true that the symbolic values are the same at compile time.

The Rosen et al. algorithm associates a defining point (DEFP) to each variable definition (DEF). A DEFP, is a point in a program listing where, for the first time, a value is calculated in the code sequence. The value may be calculated with respect to any variable. A DEF is an assignment of a value to a variable. The relationship between a DEF and its DEFP is specified as follows:

(i) The symbolic value associated with a DEF is equal to the symbolic value associated with the DEFP.

(ii) The basic block containing the DEF is dominated by the basic block containing the DEFP. That is, the basic block containing DEF is executed only if the basic block containing DEFP is executed.

Accordingly, it is known that if a value numbering procedure assigns two values in a program to a partition and appends an identical symbol thereto, that the two values are identical. It is further to be understood that the Rosen et al. procedure is conservative, in that it does not guarantee that every value which may be found to be redundant in a program listing is or may be partitioned so as to be associated with an identical symbol value, but rather that all values which are partitioned and associated with an identical symbol are identical.

Assuming that a redundant branch statement can be identified, the statement can be removed and replaced with an unconditional branch statement or joined with succeeding program statements. An example will serve to illustrate a redundant branch elimination (RBE) procedure. Consider the following program provided as input to a compiler which includes two conditional branch statements (CBSs):

```
if (x == c) {        // branch1
    S
    if (x == c) {    // branch2
        T
    }
}
```

The statement "if (x==c)" can be read as: "if x compared to c indicates an equality, then the result of the test (which forms part of the branch) is a Boolean "true", otherwise the result is a Boolean "false". Further, only if the Boolean value is true is the remaining statement within the brackets { . . . } executed. Thus, provided that the statement S does not alter the value of variable x, the test x==c at branch2 is true if and only if the test x==c is true at branch1. It follows that in any execution of the program, statement T will be executed if and only if statement S is executed. Therefore, the compiler can transform the program into:

```
if (x == c) {
    S
    T
}
```

Thus, the redundant branch (branch2) in the original program has been eliminated.

A problem in the prior art has been that identification of redundant CBSs has been difficult and time consuming. Accordingly, there is a need for a more accurate method and apparatus for both identification and removal of redundant branch statements from program listings.

SUMMARY OF THE INVENTION

The procedure of the invention eliminates redundant conditional branch statements (CBSs) from a program, wherein the program includes (i) plural blocks of program statements, (ii) a definition statement (DEF) for each variable in the program that assigns a value to each variable, (iii) a defining point (DEFP) which is a first point in the program that a value is calculated, and (iv) plural CBSs. Each CBS transfers control to one of two target blocks of program statements, dependent upon an operation code and controlling variable that form a part of the test associated with the CBS. The procedure associates all DEFs which define a same value, with a DEFP for the same value and determines (i) a controlling variable upon which a test CBS is dependent, (ii) a DEF of the controlling variable of the test CBS and (iii) a DEFP for the DEF of the controlling variable. If a value first calculated at the DEFP found in (iii) is utilized by a CBS, the procedure finds which arm of the CBS reaches the test CBS; and then revises a block of program statements that include the test CBS, to eliminate at least a test required by the test CBS, and replaces the conditional branch with an unconditional branch.

DETAILED DESCRIPTION OF A PREFERRED EMBODIMENT

Figure 1:
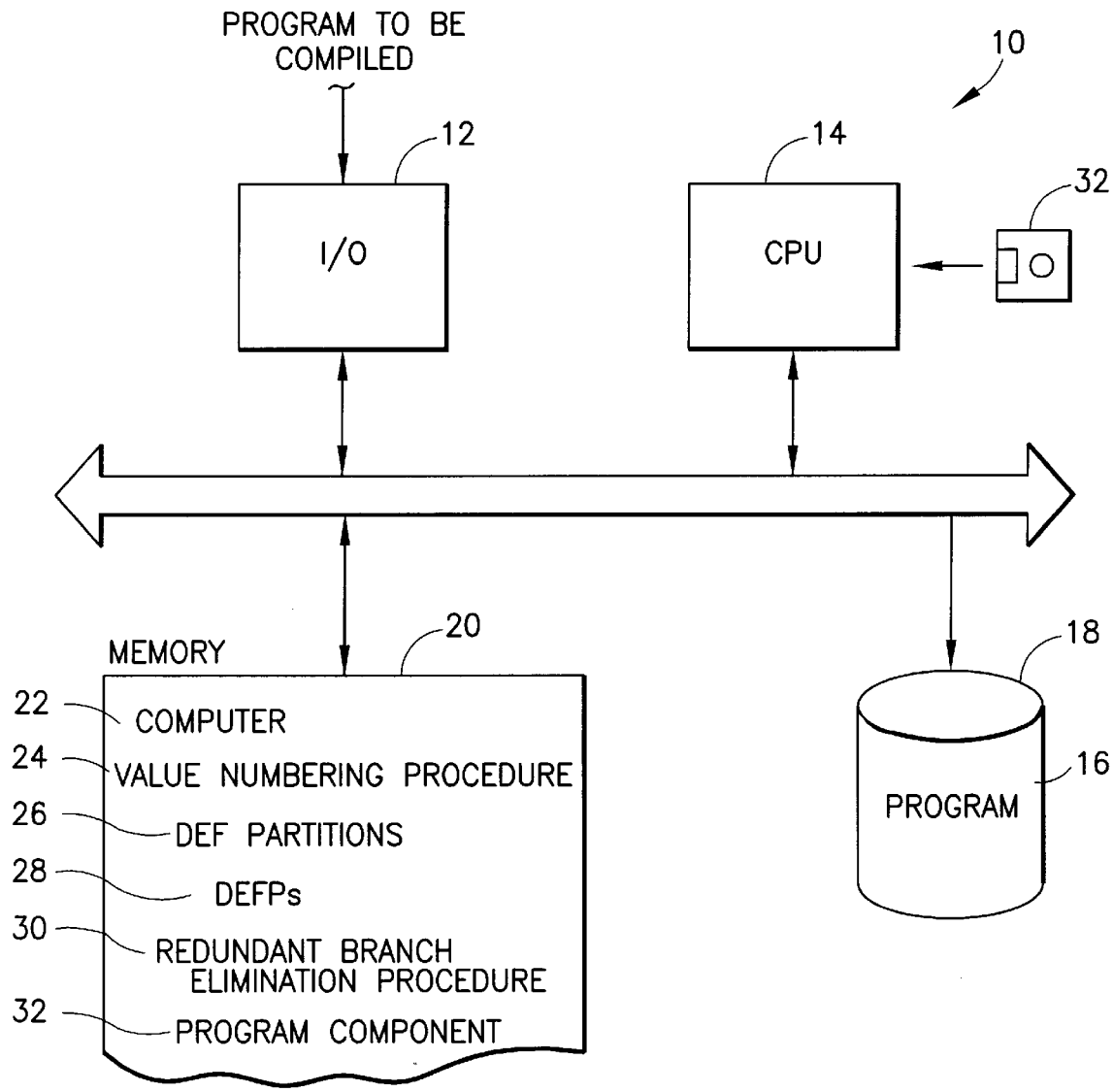
FIG. 1 is a high-level block diagram of a system for performing the invention.

Referring to FIG. 1, a computer 10 includes an input/output module 12 for receiving a program to be compiled and a central processing unit (CPU) 14 for performing compile actions on the program. The received program 16 is stored in a disk drive 18, prior to and after being subjected to the compile action of compiler 22 that is stored in memory 20. Compiler 22 includes a value numbering procedure 24, a DEF partitioning procedure 26, a DEFP identification procedure 28 and a redundant branch elimination (RBE) procedure 30. Memory 20 also includes a program component 32 which is being subjected to the action of compiler 22 and its subroutines.

It is to be understood that the illustration of memory 20 as including listings of DEF partitions and/or identifications of DEFPs is merely schematic, as those procedures may be directly incorporated into the program listing by the setting of flags or other indicators in appropriate field positions.

While it is to be hereafter assumed that the procedures shown in memory 20 have already been loaded thereinto, the controlling programs and subroutines may be present on a memory disk 32 or other memory media, which is loaded directly into CPU 14 to control the action thereof.

The elimination of a redundant CBS can be illustrated with the following example:

```
1. x = a + b;
2. if (x == c) {      // branch1
3.    S
4.    y = a + b;
5.    if (y == c) {   // branch2
6.       T
7.    }
8. }
```

Value numbering of the values present in the above exemplary program component guarantees that y has the same value at branch2 that x has at branch1, i.e. (y==c) is true at branch2 if and only if (x==c) is true at branch1. Furthermore, the conditional (y==c) is reached if and only if (x==c) is true. Thus, the conditional (y==c) always evaluates to true. Because branch2 is completely determined by branch1, it is called "redundant".

Equipped with the knowledge that "(y==c) will always evaluate to true", the redundant branch can be eliminated as follows:

```
1. x = a + b;
2. if (x == c) {      // branch1
3.    S
4.    y = a + b;
5.    T
6. }
```

The logic required to arrive at the conclusion that "(y==c) will always evaluate to true" can be stated as follows: given a conditional branch, the logic is required to report whether or not the branch is completely determined by a previous branch; and if the branch is completely determined, the logic is also required to report the predicted target of the redundant branch. This logic will be described below. Once a redundant branch is detected, the redundant branch can be eliminated (also described below).

Given a CBS, say branch2, RBE procedure 30 first determines whether or not the branch is redundant, and if so, what the predicted target statement is. The target statement of a branch is a function of two parameters: the Boolean value (i.e., true/false) which controls branch2 (hereafter "Boolean2") and the instruction opcode of branch2.

The test condition of the CBS producing Boolean2 is also a DEF, i.e. it is a compare instruction applied to two inputs (y and c) to define a true or a false Boolean value. RBE procedure 30 associates a DEFP with this definition. There are two cases: If the DEFP and the DEF are in the same block, then RBE procedure 30 asserts that branch2 is not a redundant branch. If the DEFP is not in the same block as the DEF, then the possibility exists that branch2 is redundant and RBE procedure 30 proceeds with the analysis.

If the DEFP is not consumed by a CBS, RBE procedure 30 asserts that branch2 is not redundant. If the DEFP is consumed by a CBS, then the possibility exists that this branch, say branch1, makes branch2 redundant and the procedure continues. The intuition at this point is that Boolean2 at branch2 is equal to Boolean1 at branch1, and if exactly one arm of branch1 leads to branch2, then the value of the Boolean1 can be inferred.

RBE procedure 30 asserts that the basic block containing the DEF is control dependent on the basic block containing DEFP. Therefore at least one arm of the basic block containing DEFP reaches the basic block containing DEF. Standard graph algorithms can compute whether or not the basic block containing DEFP has exactly one arm that reaches the basic block containing DEF. If more than one arm of the basic block containing DEFP, i.e., branch1, reaches the basic block containing DEF, then RBE procedure 30 asserts that branch2 is not redundant. If exactly one arm of branch1 reaches the basic block containing branch2, then the value of Boolean1 can be inferred as a function of the opcode of branch1 and the Boolean associated with the arm reaching branch2.

For instance, if branch1 tests for true and the true arm of the branch1 reaches branch2, then boolean1 must be true; if branch1 tests for true and the false arm of the branch1 reaches branch2, then Boolean1 must be false. The complete set of inferences can be recorded in tabular form:

|  | true arm of branch1 reaches branch2 | false arm of branch1 reaches branch2 |
| --- | --- | --- |
| branch1 tests for true | Boolean1 = true | Boolean1 = false |
| branch1 tests for false | Boolean1 = false | Boolean1 = true |

Having inferred the value of Boolean1 and given the fact that the value produced by DEFP is equal to the value produced by DEF, i.e. boolean1=Boolean2, it is straightforward to predict the target of branch2. The prediction is a function of Boolean2 and the opcode of branch2.

If RBE procedure 30 determines that a branch is redundant and provides the predicted target of the redundant branch, the redundant CBS can be deleted and replaced with an unconditional branch to the predicted target. As the unconditional branch is superfluous, in many cases the source and target basic blocks can be merged into a single basic block, thus eliminating any branch instruction. However, sometimes such a merger is not possible, so the unconditional branch must be used.

Figure 2A:
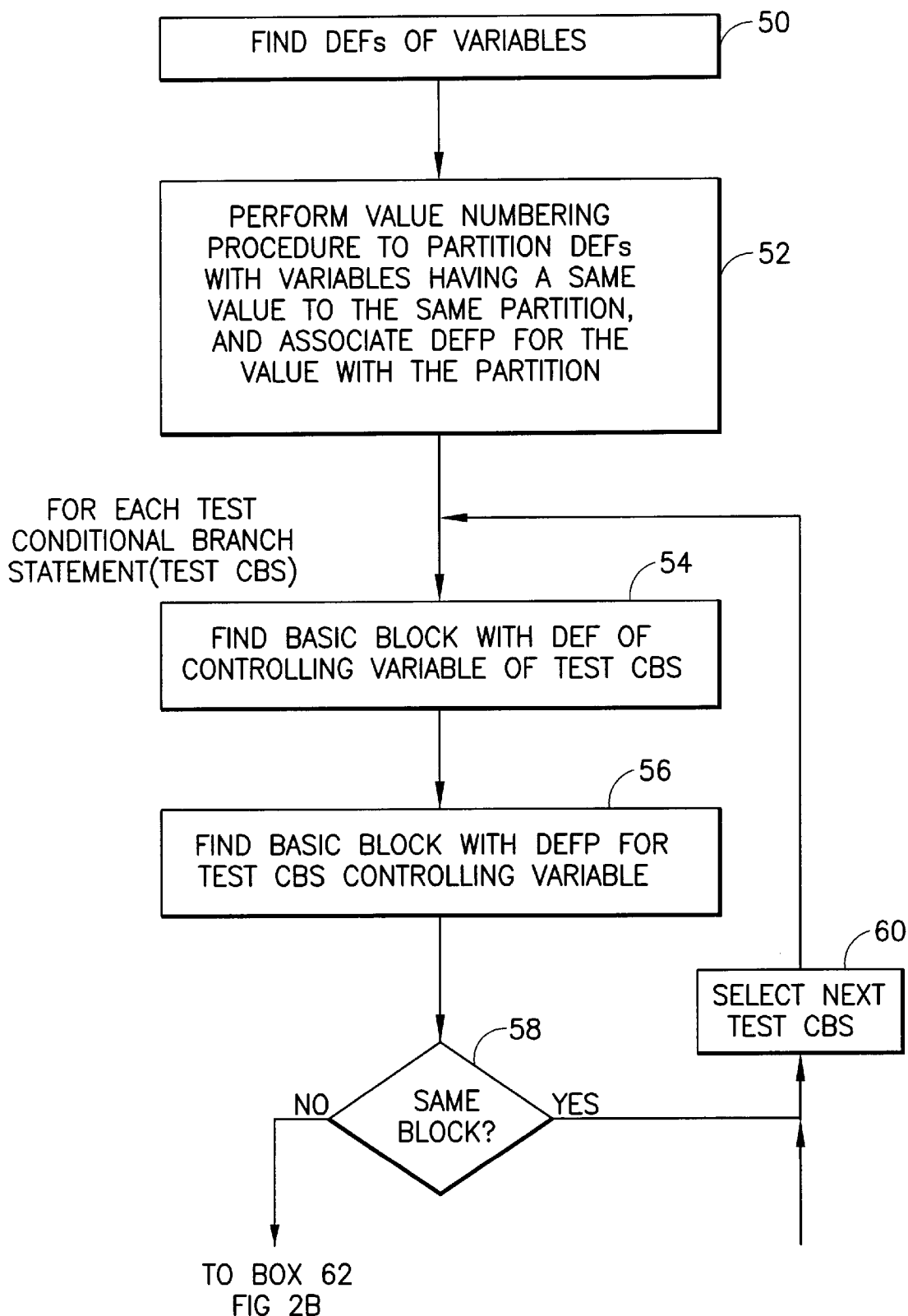
FIGS. 2A and 2B comprise a logic flow diagram illustrating the method of the invention.
Figure 2B:
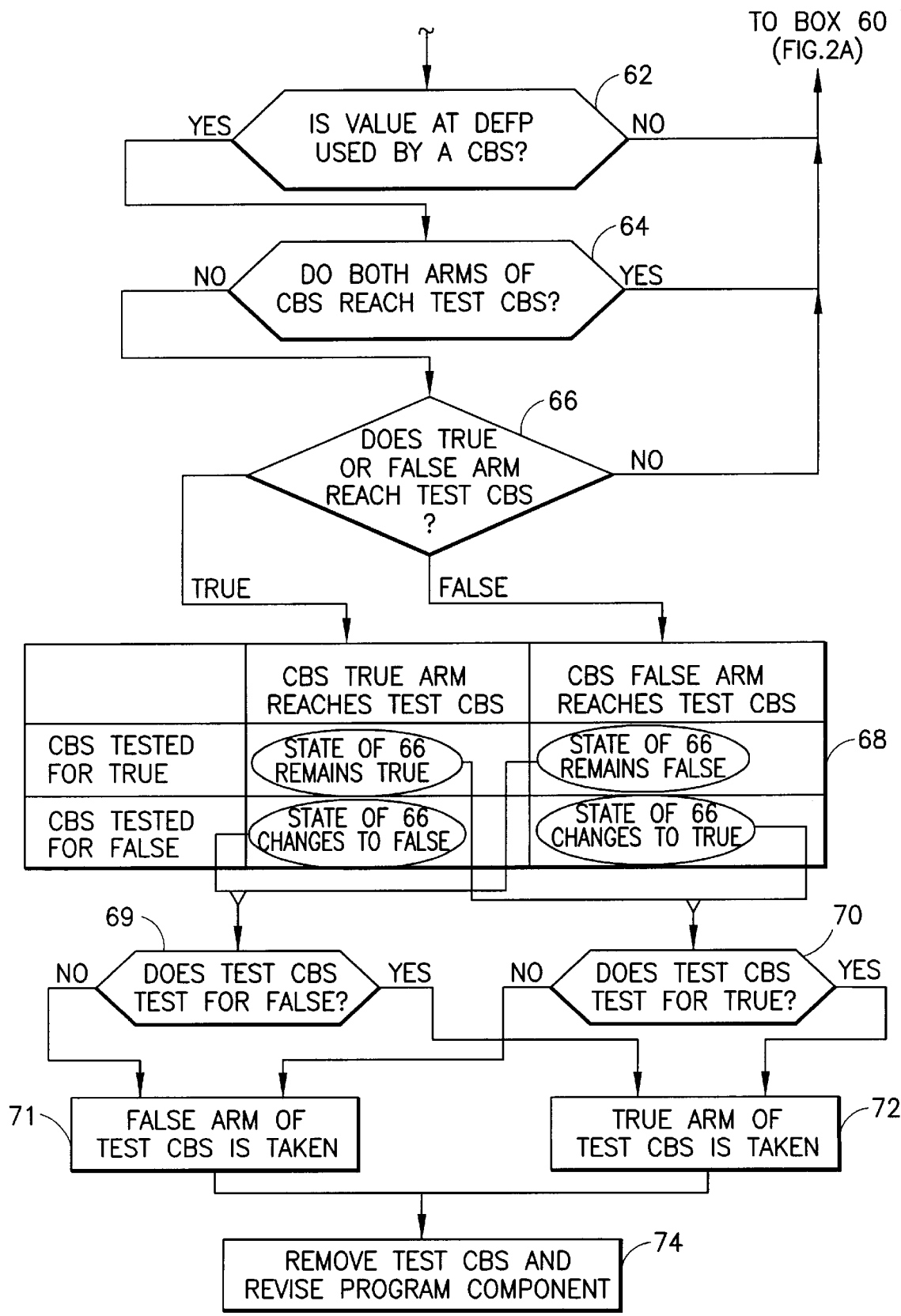
Figure 3:
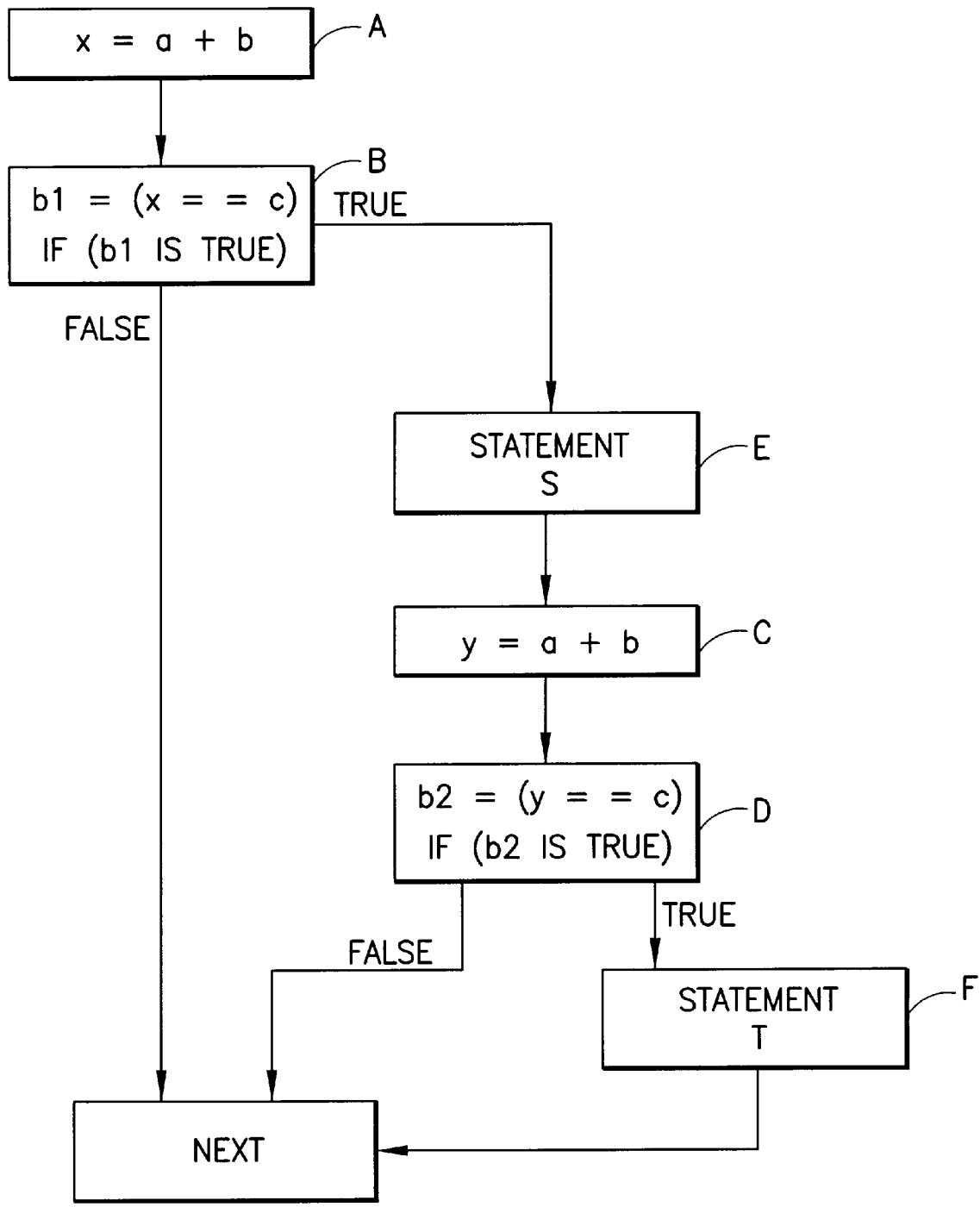
FIG. 3 is a block diagram illustrating an exemplary program component which includes two branch statements, one of which is redundant.

Turning now to FIGS. 2A and 2B, the procedure of the invention will be described in further detail, using the exemplary program component of FIG. 3. Note that FIG. 3 is a diagrammatic representation of the dual branch program component example given above. Before discussing the steps illustrated in FIGS. 2A, 2B, it is worthwhile examine the individual basic blocks of the exemplary program component shown in FIG. 3. Note that in basic block A, variable x is defined as a+b. Thus, basic block A includes not only the DEF of "x" but also, in this example, is assumed to be the first time that the value a+b is calculated. Accordingly, basic block A includes the DEFP of a+b. Basic block B includes a test and assignment instruction b1=(x==c) which, itself, is defined in the same basic block B. Also included in basic block B is a test statement "if(b1 is true)" which controls the arm that is taken from basic block B in dependence upon the result of the calculation of b1. More specifically, if b1 finds that x=c, then b1 is true and the true arm is taken. If by contrast, the test statement is "if(b1 is false)", and b1 finds that x=c, then the false arm would be taken. Accordingly, the same result of the calculation of b1 can result in two different Boolean paths being taken, dependent upon the following "if" condition.

The DEFP of "x" can be found in basic block A. The DEFP for "c" is assumed to be farther up in the code listing and is not illustrated.

Basic block C includes a DEF of variable y. Further, the value a+b that is calculated in basic block C has its DEFP in basic block A, as basic block A contains the first calculation of the value a+b. Lastly, basic block D includes a second branching statement b2, that is dependent upon the values y and c. The DEF of y is present in basic block C, and the DEFP for a+b is found in basic block A. Statements S and T reside in basic blocks E and F, respectively, and it is assumed for the purposes of this example that statement S does not modify the values a, b and/or c.

Turning now to FIG. 2A, compiler 22 initially finds all DEFs of variables in program 16 (box 50). Thereafter, compiler 22 invokes value numbering procedure 24 (box 52) and partitions the DEFs so that all DEFs assigned to a partition define a variable which uses the same value. Further, value numbering procedure 24 associates the DEFP of the value (i.e., where the value is first calculated), with each partition. At this stage of the procedure, each DEF has been associated with a partition symbol, which symbol is further associated with a DEFP. The respective DEFP indicates the point in the program where the value that is used by all DEFs in a partition is first calculated. Accordingly, all variables whose DEFs are found within a partition include a common value that is initially calculated at the associated DEFP.

Referring to FIG. 3, the DEFs of x and y found, respectively, in basic blocks A and C, are classified within a single partition and the DEFP therefor is identified as being in block A, i.e., x=a+b. Further, since values b1 and b2 are the same and are present in CBSs in basic blocks B and D, they too are associated with a partition and the DEFP present in block B.

Returning to FIG. 2A, as shown in box 54, compiler 22 invokes RBE procedure 30 which performs the following steps with respect to each CBS. Initially, for a given CBS that is to be tested for redundancy (hereafter, the "test CBS"), a basic block is found which contains the DEF of a controlling variable of the test CBS. If it is assumed that the test CBS is "if b2 is true", as is present in basic block D, the DEF of b2 is found in block D wherein "b2=(y==c)". The DEFP of controlling variable b2 is found in basic block B wherein "b1=(x==c)", (i.e., value numbering procedure 24 has determined that the DEFs of b1 and b2 are the same because x=y=a+b, and the variables a, b and c are not revised in basic blocks B, E or C). The DEFP of y is found by its association with the partition containing the DEFs of x and y. Value numbering procedure 24, before it assigns a same value number to x and y, determines that no statements between the path from the DEF of x to the DEF of y (i.e., the statements in basic blocks B and E) revise the values of a and b.

Next, (box 56) the DEFP of the value that is employed by the controlling variable of the test CBS (b2) is found in basic block B. Then, it is next determined whether the found DEF and DEFP are within a same basic block (decision box 58). If yes, a next test CBS is selected (box 60) and the procedure recycles to box 54. The rationale for this action is that if both the DEFP for the controlling variable of the test CBS and its DEF are within a same basic block, that there can be no redundancy of the test CBS, as each basic block ends with a conditional branch statement. If decision box 58 indicates a no, as in the example of FIG. 3, the procedure moves to the step shown in decision box 62.

Here it is determined if the value calculated at the identified DEFP is used in a CBS that precedes the test CBS in program 16. If not, the procedure recycles back to box 60. Otherwise, the procedure determines (decision box 64) if both arms of the just identified CBS reach the basic block which contains the test CBS. If yes, the procedure recycles back to box 60, as there is no way of determining which arm will reach the test CBS. If no, the procedure moves to decision box 66 where the true and false arms from the basic block containing the CBS are traced to see if one reaches the basic block containing the test CBS.

If either one or the other of the arms reaches the basic block containing the test CBS, it is then known, assuming that both the CBS and test CBS test the variable for a same logical state, i.e., both test for true or both test for false, that both will exhibit a same Boolean true or false value. However, the tests may differ, i.e., one may test for true while the other may test for false. In such case, the arm derived for the basic block containing the CBS must be altered to reflect the different test states, before its value is attributed to the test CBS.

Such alteration is accomplished in accord with logic table 68. For instance (see FIG. 3), if it is determined that basic block B tests for a true condition of CBS b1, and it is the true arm of basic block B which reaches basic block D, then the true state ascribed to the arm of basic block B remains true. If the test in basic block B is for false, and the true arm is the one which reaches basic block D, then the Boolean value of the CBS arm that reaches basic block D is reversed to false. A similar action occurs if it is the false arm of basic block B (which is found to reach basic block D containing the test CBS b2), as controlled by the second column of logic table 68.

Based on the results of logic table 68, and the condition that the test CBS tests for (boxes 69, 70), either the true arm or the false arm of the test CBS is taken (boxes 71, 72).

After the logic table 68 is utilized, it is known that basic block B tests for true; that it is the true arm of basic block B which reaches basic block D; and that test CBS (b2) should be ascribed a true value. Thereafter, test CBS (b2) can be replaced by an unconditional branch to statement T (block F) or statement T can be merged into block D, thus eliminating the branch instruction altogether (box 74).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for eliminating redundant conditional branch statements (CBSs) from a program, wherein the program includes (i) plural blocks of program statements, (ii) a definition statement (DEF) for each variable in said program, that assigns a value to said each variable, (iii) a defining point (DEFP) which is a first point in said program that a value is calculated, and (iv) plural CBSs, each CBS transferring control to one of two target blocks of program statements, dependent upon a controlling variable of said CBS, said method comprising the steps of:

a) associating all DEFs which define a same value, with a DEFP for said same value;

b) determining (i) a controlling variable upon which a test CBS is dependent, (ii) a DEF of said controlling variable and (iii) a DEFP for said DEF of said controlling variable and if it is determined that said DEF of said controlling variable and said DEFP for said DEF of said controlling variable both reside in a common block of program statements, selecting a new test CBS and repeating step b) before proceeding to step c);

c) if a value first calculated at said DEFP found in step b) (iii) is utilized by a CBS, finding which of two logical arms of said CBS reaches said test CBS and, based upon a test statement associated with said CBS and a path emanating from a block of program statements including said CBS, determining a logic state of said controlling variable of the test CBS; and d) revising a block of program statements including said test CBS to eliminate at least a test required by said test CBS, by use of said logic state.

2. The method as recited in claim 1, wherein step d) revises said block of program statements by eliminating said test CBS and inserting an unconditional branch statement to a subsequent block of program statements.

3. The method as recited in claim 1, wherein step d) revises said block of program statements by eliminating said test CBS and appending to said block a subsequent block of program statements which commences with a statement that would have followed said test CBS, before its elimination.

4. The method as recited in claim 1, wherein step c) utilizes relationships shown in the following chart to make said determination:

| | Logic state of controlling variable of test CBS: | |
| --- | --- | --- |
| | CBS true arm reaches test CBS | CBS false arm reaches test CBS |
| CBS tested for true | true | false |
| CBS tested for false | false | true |

5. A memory media for controlling a computer to eliminate redundant conditional branch statements (CBSs) from a program, wherein the program includes (i) plural blocks of program statements, (ii) a definition statement (DEF) for each variable in said program, that assigns a value to said each variable, (iii) a defining point (DEFP) which is a first point in said program that a value is calculated, and (iv) plural CBSs, each CBS transferring control to one of two target blocks of program statements, dependent upon a controlling variable of said CBS, said memory media comprising:

a) means for controlling said computer to associate all DEFs which define a same value, with a DEFP for said same value;

b) means for controlling said computer to determine (i) a controlling variable upon which a test CBS is dependent, (ii) a DEF of said controlling variable and (iii) a DEFP for said DEF of said controlling variable, said means b) inhibiting operation of means c) upon determining that said DEF of said controlling variable and said DEFP for said DEF of said controlling variable both reside in a common block of program statements;

c) means for controlling said computer to find which of two logical arms of a CBS reaches said test CBS, if a value first calculated at said DEFP found in step b) (iii) is utilized by said CBS and, based upon a test statement associated with said CBS and a path emanating from a block of program statements including said CBS, determining a logic state of said controlling variable of the test CBS; and d) means for controlling said computer to revise a block of program statements including said test CBS to eliminate at least a test required by said test CBS, by use of said logic state.

6. The memory media as recited in claim 5, wherein means d) controls said computer to revise said block of program statements by eliminating said test CBS and appending an unconditional branch statement to a subsequent block of program statements.

7. The memory media as recited in claim 5, wherein means d) controls said computer to revise said block of program statements by eliminating said test CBS and appending to said block a subsequent block of program statements which commences with a statement that would have followed said test CBS, before its elimination.

8. The memory media as recited in claim 5, wherein means c) controls said computer to utilize the following relationships to make said determination:

| Logic state of controlling variable of test CBS: | | |
|---|---|---|
| | CBS true arm reaches test CBS | CBS false arm reaches test CBS |
| CBS tested for true | true | false |
| CBS tested for false | false | true |

\* \* \* \* \*